US011970283B2

(12) United States Patent
Groninga et al.

(10) Patent No.: US 11,970,283 B2
(45) **Date of Patent: *Apr. 30, 2024**

(54) DUAL MOTOR INPUT WITH OVERRUNNING CLUTCH

(71) Applicant: Textron Innovations Inc., Providence, RI (US)

(72) Inventors: Kirk L. Groninga, Keller, TX (US); Daniel B. Robertson, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/115,265

(22) Filed: Feb. 28, 2023

(65) Prior Publication Data

US 2023/0202668 A1 Jun. 29, 2023

Related U.S. Application Data

(63) Continuation of application No. 16/414,402, filed on May 16, 2019, now Pat. No. 11,613,375.

(51) Int. Cl.

| | |
|---|---|
| ***B64D 35/08*** | (2006.01) |
| ***B64C 27/12*** | (2006.01) |
| ***B64C 27/28*** | (2006.01) |
| ***B64D 27/24*** | (2006.01) |
| *F16H 1/28* | (2006.01) |
| *F16H 57/00* | (2012.01) |
| *H02K 7/116* | (2006.01) |

(52) U.S. Cl.

CPC .............. *B64D 35/08* (2013.01); *B64C 27/12* (2013.01); *B64C 27/28* (2013.01); *B64D 27/24* (2013.01); *F16H 1/28* (2013.01); *F16H 57/0025* (2013.01); *H02K 7/116* (2013.01)

(58) Field of Classification Search

None

See application file for complete search history.

(56) References Cited

U.S. PATENT DOCUMENTS

| | | | |
|---|---|---|---|
| 4,554,989 | A | 11/1985 | Gruich et al. |
| 4,955,561 | A | 9/1990 | Seefluth |
| 5,730,676 | A | 3/1998 | Schmidt |
| 6,098,921 | A | 8/2000 | Piasecki |
| 7,185,496 | B2 | 3/2007 | Herlihy |
| 8,027,772 | B2 | 9/2011 | Vialle |
| 8,283,796 | B2 | 10/2012 | Certain |
| 8,939,399 | B2 | 1/2015 | Kouros et al. |

(Continued)

FOREIGN PATENT DOCUMENTS

| | | | |
|---|---|---|---|
| DE | 102004004480 | A1 | 6/2006 |
| DE | 102015226836 | A1 | 7/2017 |

(Continued)

*Primary Examiner* — Justin D Seabe
*Assistant Examiner* — Behnoush Haghighian
(74) *Attorney, Agent, or Firm* — Bradley Arant Boult Cummings LLP

(57) ABSTRACT

A dual-motor system includes a first motor rotationally coupled to a first drive shaft. The first drive shaft is coupled to a common shaft couplable to a rotationally driveable member. The dual-motor system also includes a second motor rotationally coupled to a second drive shaft. The second drive shaft is coupled to the common shaft. The first motor and the second motor are coaxially aligned with the first drive shaft passing through the second drive shaft.

20 Claims, 3 Drawing Sheets

40 38 44 46 36 48 45 43 34-2 5 42 34-1

(56) References Cited

U.S. PATENT DOCUMENTS

| | | | |
|---|---|---|---|
| 9,387,934 | B2 | 7/2016 | Gomez |
| 9,902,493 | B2 | 2/2018 | Simon et al. |
| 10,086,933 | B2 | 10/2018 | Roberts et al. |
| 2008/0006739 | A1 | 1/2008 | Mochida et al. |
| 2012/0209456 | A1 | 8/2012 | Harmon et al. |
| 2017/0174337 | A1 | 6/2017 | Roberts et al. |
| 2017/0174355 | A1 | 6/2017 | Waltner et al. |
| 2017/0190435 | A1 | 7/2017 | Kobayashi et al. |
| 2017/0225573 | A1 | 8/2017 | Waltner |
| 2018/0044029 | A1 | 2/2018 | Koegler et al. |
| 2018/0251226 | A1 | 9/2018 | Fenny et al. |
| 2019/0071172 | A1 | 3/2019 | Caldwell |
| 2019/0345949 | A1 | 11/2019 | Harvey |

FOREIGN PATENT DOCUMENTS

| | | | |
|---|---|---|---|
| EP | 1557353 | A1 | 7/2005 |
| EP | 3142230 | A1 | 3/2017 |

DUAL MOTOR INPUT WITH OVERRUNNING CLUTCH

CROSS-REFERENCE TO RELATED APPLICATIONS

This patent application is a continuation of U.S. patent application Ser. No. 16/414,402, filed on May 16, 2019. U.S. patent application Ser. No. 16/414,402 is incorporated by reference.

TECHNICAL FIELD

This disclosure relates in general to the field of aircraft, and more particularly, to aircraft power systems, components thereof, and features and methods relating thereto.

BACKGROUND

This section provides background information to facilitate a better understanding of the various aspects of the disclosure. It should be understood that the statements in this section of this document are to be read in this light, and not as admissions of prior art.

Conventionally powered rotorcraft, such as helicopters and tiltrotors, are driven by a combustion engine mechanically transmitting power to the rotors. In some rotorcraft, the rotor's mechanical drive system is replaced with direct drive electric or hydraulic motor systems. This approach can be used to improve rotorcraft propulsion systems, for example, to reduce noise or to improve safety.

SUMMARY

A dual-motor system includes a first motor rotationally coupled to a first drive shaft. The first drive shaft is coupled to a common shaft couplable to a rotationally driveable member. The dual-motor system also includes a second motor rotationally coupled to a second drive shaft. The second drive shaft is coupled to the common shaft. The first motor and the second motor are coaxially aligned with the first drive shaft passing through the second drive shaft.

An exemplary aircraft includes a rotor, a common shaft coupled to the rotor, a first motor rotationally coupled to a first drive shaft, the first drive shaft coupled to the common shaft, and a second motor rotationally coupled to a second drive shaft, the second drive shaft coupled to the common shaft.

An aircraft includes a rotor couplable to a common shaft and a first motor rotationally coupled to a first drive shaft. The first drive shaft is coupled to the common shaft. The aircraft also includes a second motor rotationally coupled to a second drive shaft. The second drive shaft is coupled to the common shaft. The first motor and the second motor are coaxially aligned with the first drive shaft passing through the second drive shaft.

An aircraft includes a rotor coupled to a common shaft through a planetary gear set and a first electric motor rotationally coupled to a first drive shaft. The first drive shaft is coupled to the common shaft by a first overrunning clutch. The aircraft also includes a second electric motor rotationally coupled to a second drive shaft, the second drive shaft coupled to the common shaft by a second overrunning clutch. The first motor and the second motor are coaxially aligned with the first drive shaft passing through the second drive shaft.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
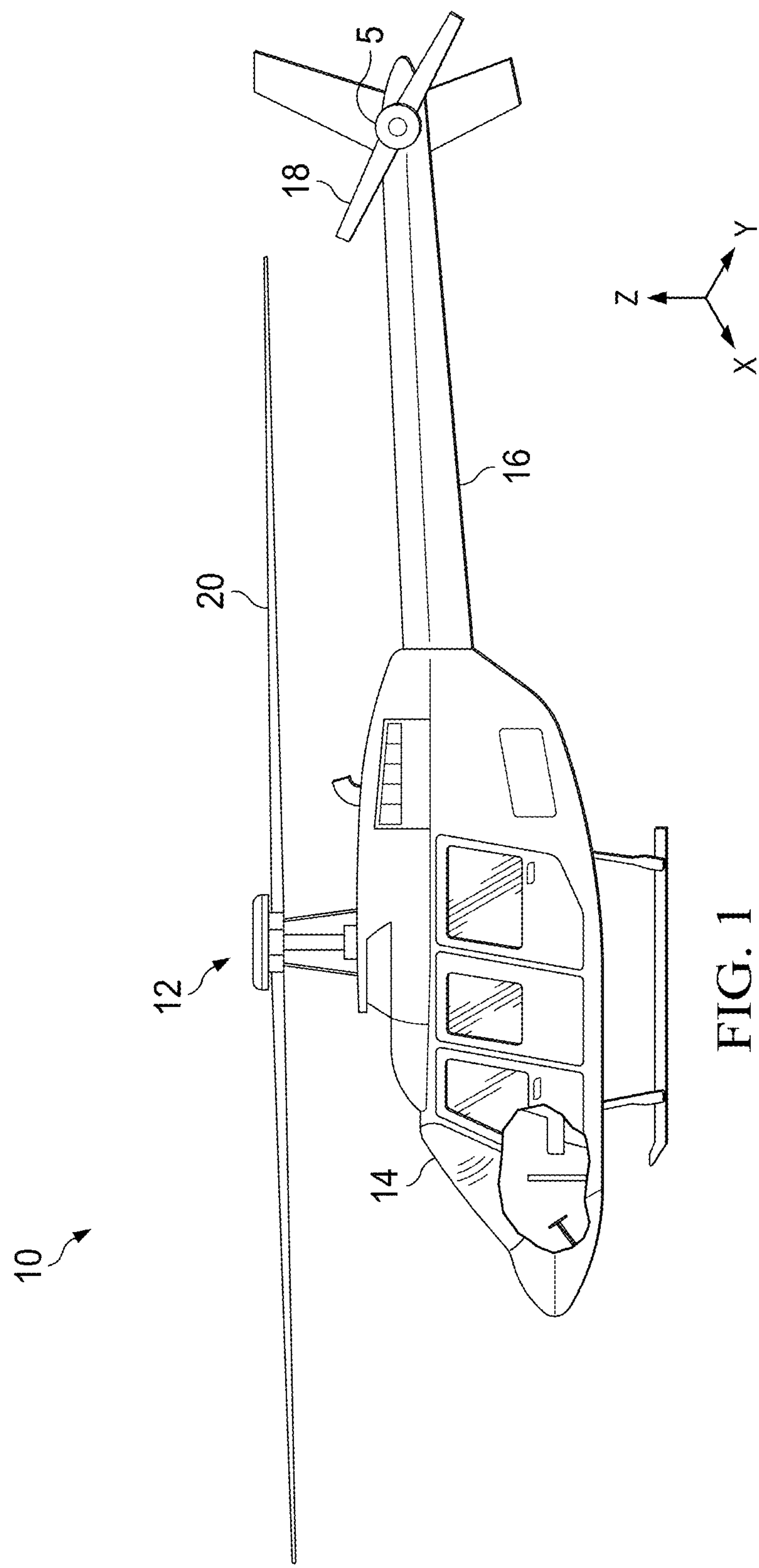
FIG. 1 illustrates an exemplary rotor aircraft in which a dual motor input may be incorporated.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as “inboard,” “outboard,” “above,” “below,” “upper,” “lower,” or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms “connect,” “connection,” “connected,” “in connection with,” and “connecting” may be used to mean in direct connection with or in connection with via one or more elements. Similarly, the terms "couple," "coupling," and "coupled" may be used to mean directly coupled or coupled via one or more elements.

Figure 2:
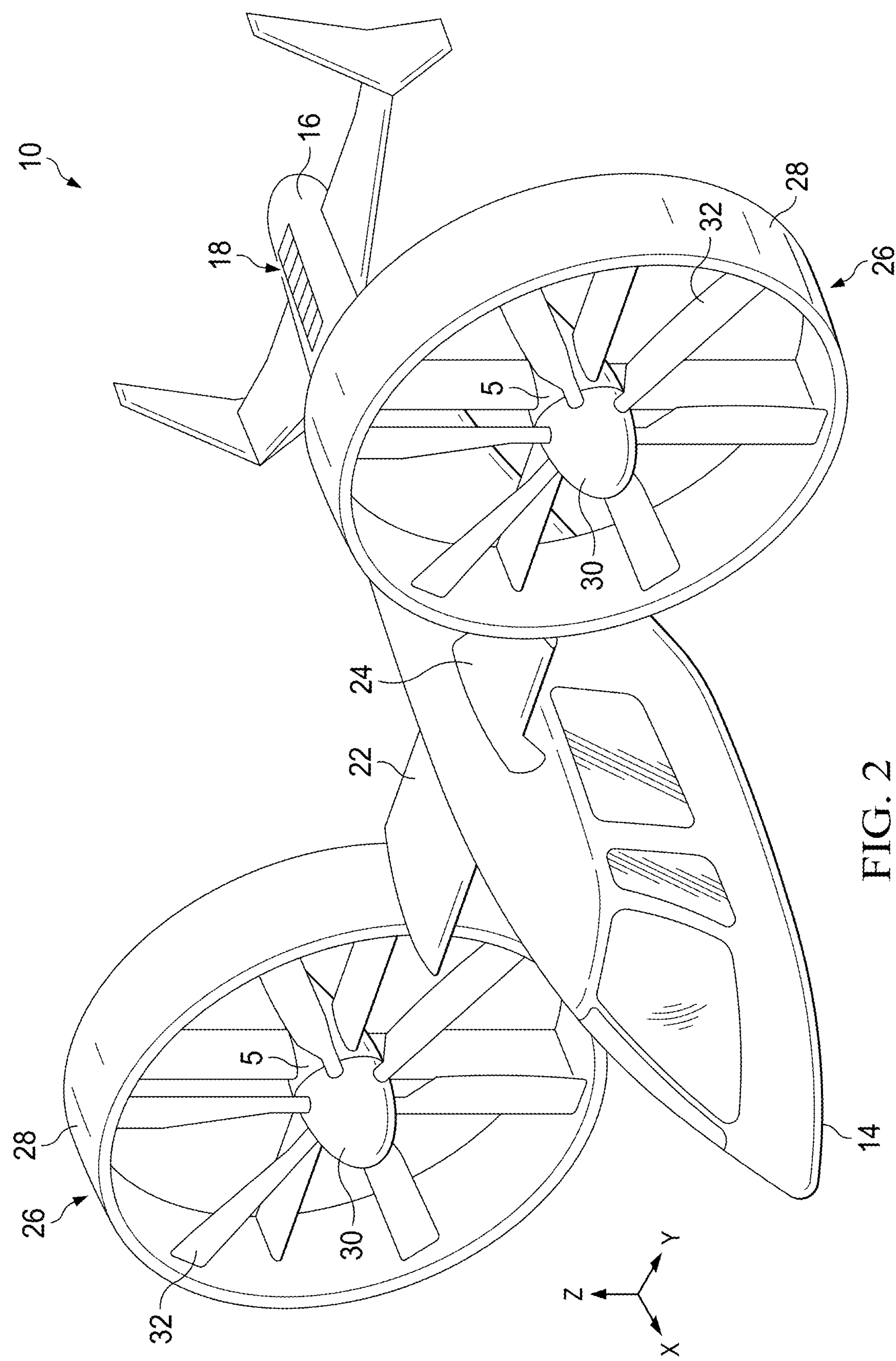
FIG. 2 illustrates another exemplary rotor aircraft in which a dual motor input may be incorporated.

FIGS. 1 and 2 depict three mutually orthogonal directions X, Y, and Z forming a three-dimensional frame of reference XYZ. Longitudinal axis X corresponds to the roll axis that extends through the center of aircraft 10 in the fore and after directions. Transverse axis Y is perpendicular to longitudinal axis X and corresponds to the pitch axis (also known as a control pitch axis or "CPA"). The X-Y plane is considered to be "horizontal." Vertical axis Z is the yaw axis and is oriented perpendicularly with respect to the X-Y plane. The X-Z plane and Y-Z plane are considered to be "vertical."

FIG. 1 illustrates an exemplary vertical takeoff and landing (VTOL) rotary aircraft 10 incorporating a dual motor input 5. Aircraft 10 includes a rotor system 12, a fuselage 14, and a tail boom 16 carrying an anti-torque system represented by rotor 18. Rotor system 12 includes a main rotor having multiple blades 20 for creating flight. Rotor system 12 may include a control system for selectively controlling the pitch of each blade of rotor 20 to control direction, thrust, and lift of aircraft 10. Tail boom 16 may include one or more rotors 18. Rotor 18 generally provides thrust to counter the torque due to the rotation of rotor blades 20. Teachings of certain embodiments recognize that tail rotor 18 may represent one example of a rotor or anti-torque rotor; other examples include, but are not limited to, tail propellers, ducted tail rotors, and ducted fans mounted inside and/or outside the aircraft. The anti-torque system may include two or more rotors 18, with or without a shroud, such as in a distributed anti-torque system. Teachings of certain embodiments relating to rotors and rotor systems may apply to rotor system 12 and other rotor systems, such as distributed rotors, tiltrotor, tilt-wing, and helicopter rotor systems. It should be appreciated that teachings herein apply to manned and unmanned vehicles and aircraft including without limitation airplanes, rotorcraft, hovercraft, helicopters, and rotary-wing vehicles.

In FIG. 1, dual motor input 5 is shown coupled to tail rotor 18, however, it should be recognized that main rotor 20 may also be driven by a dual motor input 5. In some embodiments, dual motor input 5 uses electric motors. In some embodiments, duel motor input 5 uses hydraulic motors.

FIG. 2 illustrates another exemplary vertical takeoff and landing (VTOL) rotary aircraft 10 incorporating a dual motor input 5. Aircraft 10 includes a fuselage 14 having a tail boom 16 extending in the aft direction. Tail boom 16 includes a tail rotor 18 in the form of variable thrust cross-flow fan system, which may be driven by a dual motor input 5. Aircraft 10 includes a wing 22 and a wing 24 extending from opposite sides, port and starboard, of fuselage 14. Each wing 22, 24 includes a ducted fan 26 type of aircraft rotor. Ducted fans 26 are rotatably coupled to wings 22, 24. Each ducted fan 26 includes a duct 28 that surrounds, or partially encloses, a rotor hub 30 from which a plurality of blades 32 radially extend. In this exemplary embodiment, each hub 30 includes a dual motor input 5 to drive blades 32. In some embodiments, dual motor input 5 uses electric motors. In some embodiments, duel motor input 5 uses hydraulic motors.

Blades 32 can be collectively manipulated to selectively control direction, thrust and lift of aircraft 10. Indeed, the collective pitch of blades 32 may be independently controlled to allow for different thrusts by each ducted fan. For example, the collective pitch of blades 32 of one ducted fan 26 may be higher or lower than the collective pitch of blade 32 of the other ducted fan 26 such that the thrusts generated by each ducted fan differ from one another.

Figure 3:
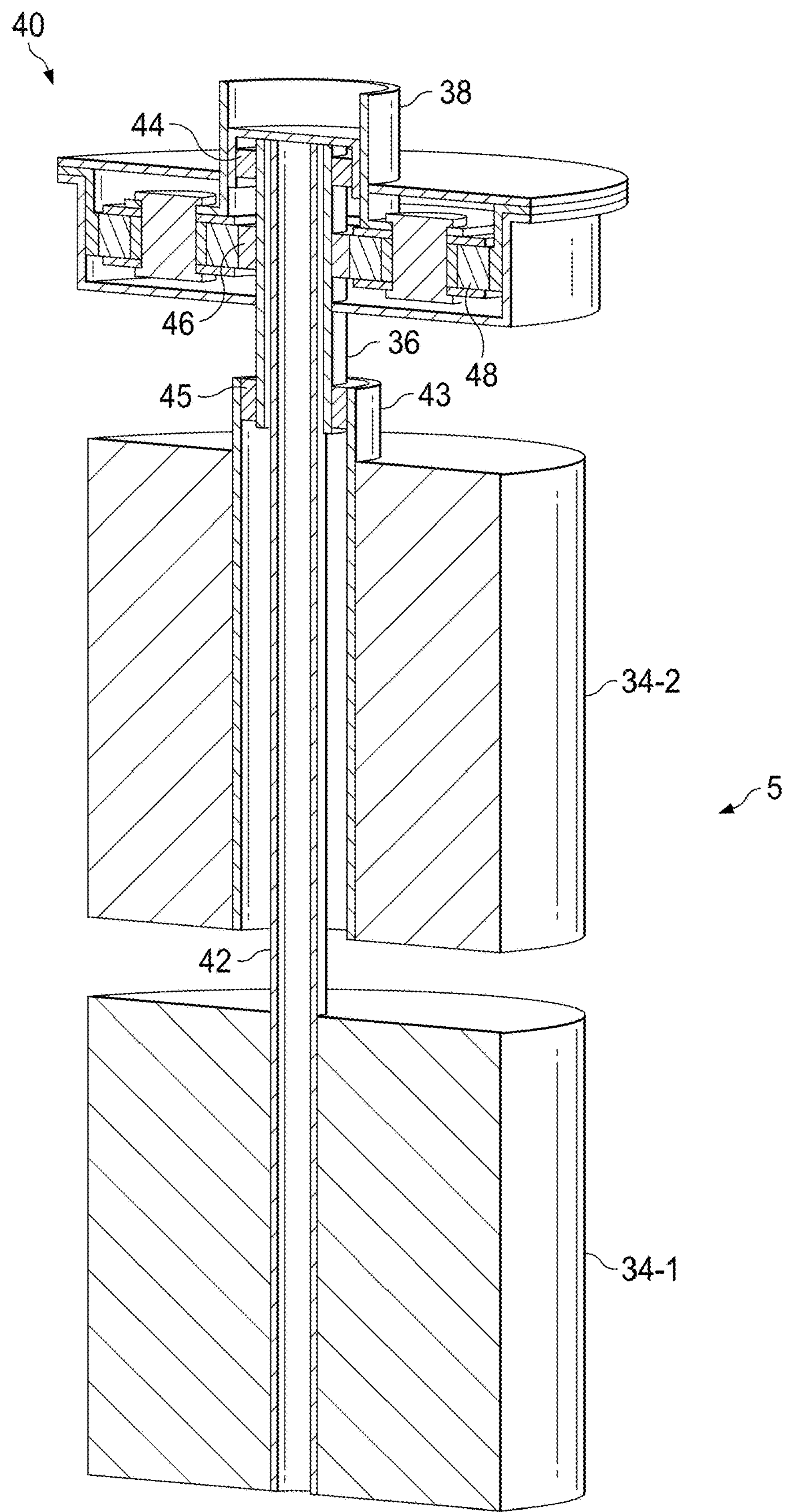
FIG. 3 illustrates an exemplary dual motor input according to one or more aspects of the disclosure.

FIG. 3 illustrates an exemplary dual motor input 5 to drive an aircraft rotor. For example, with reference to FIG. 2, dual motor input 5 is coupled, directly or indirectly to blades 32 of ducted fan 26. Dual motor input 5 can be utilized with a closed or open rotor.

Dual motor input 5 includes two or more motors 34, which are aligned coaxially, to drive a common shaft 36 that is coupled to the driven blades. Motors 34 are individually identified 34-1, 34-2, etc. In accordance with a first exemplary embodiment, motors 34 are electric motors. In the illustrated exemplary embodiment, common shaft 36 is coupled to an output shaft 38 through a transmission 40, e.g., planetary gear set. Transmission 40 may be used to reduce the rotational speed of output shaft 38 relative to the rotational speed of common shaft 36. Electric motors 34 may operate at a higher rotational speed than the rotor speeds. In particular, in a tail rotor application it is desired from time to time to minimize the tip speed of the tail rotor blades to reduce the noise level. It will be recognized by those skilled in the technical field with benefit of this disclosure that in some embodiments common shaft 36 may be the output shaft or directly connected to output shaft 38 without transmission 40 so that motors 34 directly drive the coupled rotor blades.

First motor 34-1 is rotationally coupled to a first drive shaft 42 that is rotationally coupled to common shaft 36 by a first overrunning clutch 44. Second motor 34-2 is rotationally coupled to a second drive shaft 43 that is rotationally coupled to common shaft 36 by a second overrunning clutch 45. In the illustrated exemplary embodiment, second drive shaft 43 is a hollow shaft through which first drive shaft 42 extends. Overrunning clutches 44, 45 are used to freewheel in one direction while driving in another direction of rotation. Overrunning clutches include, for example, sprag, roller ramp, wrap spring, and wedge type clutches.

In the illustrated exemplary embodiment, common shaft 36 is coupled to output shaft 38 through transmission 40. For example, common shaft 36 is coupled with a sun gear 46 by splines and planet gears 48 are coupled to output shaft 38. The rotational input of from electric motors 34 is transmitted through common shaft 36 to sun gear 46 and from sun gear to planet gears 48 and output shaft 38. Output gear 38 may be connected directly or indirectly to the rotor, e.g. blades 32, through one or more components including a bevel gear.

Dual motor input 5 provides a true dual-redundant rotor (propeller) drive using electric or hydraulic motors to maintain rotational power in the event of failure of one of the motors. An embodiment of operation of a dual motor input 5 is now described with reference FIG. 1-3. Dual motor input 5 is coupled to an aircraft rotor, e.g. blades 32 of aircraft 10 illustrated in FIG. 2. In a first example, one of the first and the second motors 34 is operated to rotate common shaft 36 and thereby rotationally drive the rotor. In the event that the operating motor 34 fails the other one of the first and the second motors is operated to rotate common shaft 36 and thereby rotationally drive the rotor. In a second example, the first and second motors 34 are simultaneously operated to rotate common shaft 36 and thereby rotationally drive the rotor. Upon failure of one of motors 34 the other motor will continue to drive the rotor.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A dual-motor system comprising:

a first motor rotationally coupled to a first drive shaft operable to drive a rotationally driveable member;

a second motor rotationally coupled to a second drive shaft, the second drive shaft operable to drive the rotationally drivable member; and wherein the first motor and the second motor are coaxially aligned with the first drive shaft and the first drive shaft passes through the second drive shaft.

2. The dual-motor system of claim 1, wherein the first motor and the second motor are electric motors.

3. The dual-motor system of claim 1, wherein the first motor and the second motor are hydraulic motors.

4. The dual-motor system of claim 1, wherein the first drive shaft is operable to drive the rotationally drivable member via a first overrunning clutch and the second drive shaft is operable to drive the rotationally drivable member via a second overrunning clutch.

5. The dual-motor system of claim 1, wherein the first drive shaft and the second drive shaft are rotationally coupled to an output shaft through a gear set.

6. The dual-motor system of claim 5, wherein the gear set is a planetary gear set.

7. The dual-motor system of claim 1, wherein:

the first drive shaft and the second drive shaft are rotationally coupled to an output shaft through a gear set; and the first motor and the second motor are electric motors.

8. The dual-motor system of claim 1, wherein the first drive shaft is coaxial with the first motor and the second drive shaft is coaxial with the second motor.

9. The dual-motor system of claim 1, wherein:

the first drive shaft is a motor shaft of the first motor; and the second drive shaft is a motor shaft of the second motor.

10. An aircraft comprising:

a rotor;

a first motor rotationally coupled to a first drive shaft and operable to drive the rotor;

a second motor rotationally coupled to a second drive shaft and operable to drive the rotor; and wherein the first motor and the second motor are coaxially aligned with the first drive shaft and the first drive shaft passes through the second drive shaft.

11. The aircraft of claim 10, wherein the rotor comprises blades.

12. The aircraft of claim 10, wherein the first motor and the second motor are electric motors.

13. The aircraft of claim 10, wherein the first drive shaft and the second drive shaft are operable to drive the rotor through a gear set.

14. The aircraft of claim 13, wherein the gear set is a planetary gear set.

15. The aircraft of claim 13, wherein the first drive shaft is operable to drive the rotor via a first overrunning clutch and the second drive shaft is operable to drive the rotor via a second overrunning clutch.

16. The aircraft of claim 14, wherein the first drive shaft is coaxial with the first motor and the second drive shaft is coaxial with the second motor.

17. An aircraft comprising:

a rotor coupled to a planetary gear set;

a first electric motor rotationally coupled to a first drive shaft, the first drive shaft coupled to a first overrunning clutch; and a second electric motor rotationally coupled to a second drive shaft, the second drive shaft coupled to a second overrunning clutch, wherein the first motor and the second motor are coaxially aligned with the first drive shaft and the first drive shaft passes through the second drive shaft.

18. The aircraft of claim 17, wherein the rotor is a tail rotor.

19. The aircraft of claim 17, wherein the rotor is in a ducted fan.

20. The aircraft of claim 17, wherein the rotor comprises blades.

* * * * *